Aug. 26, 1969   G. E. ZIEGLER   3,462,979
OVERFEED PREVENTION MEANS IN A SPIRAL DYE BECK OR THE LIKE
Filed April 19, 1968   2 Sheets-Sheet 1

INVENTOR
GEORGE EDWARD ZIEGLER
McCarthy, Depaoli & O'Brien
ATTORNEYS

Aug. 26, 1969  G. E. ZIEGLER  3,462,979
OVERFEED PREVENTION MEANS IN A SPIRAL DYE BECK OR THE LIKE
Filed April 19, 1968  2 Sheets-Sheet 2
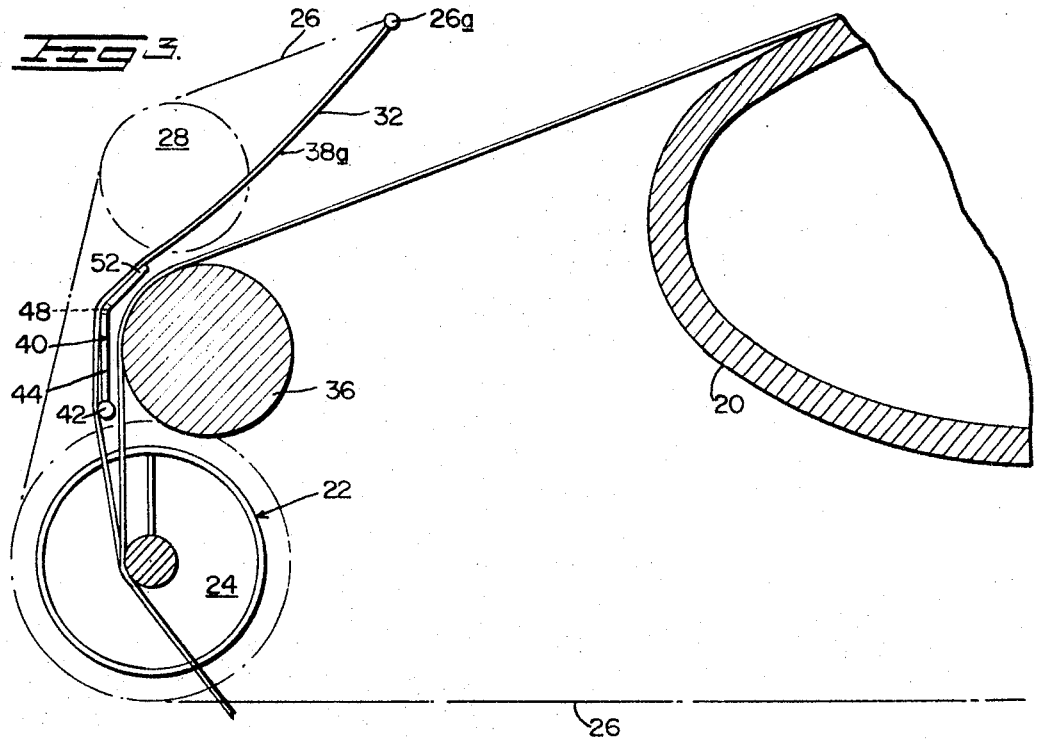
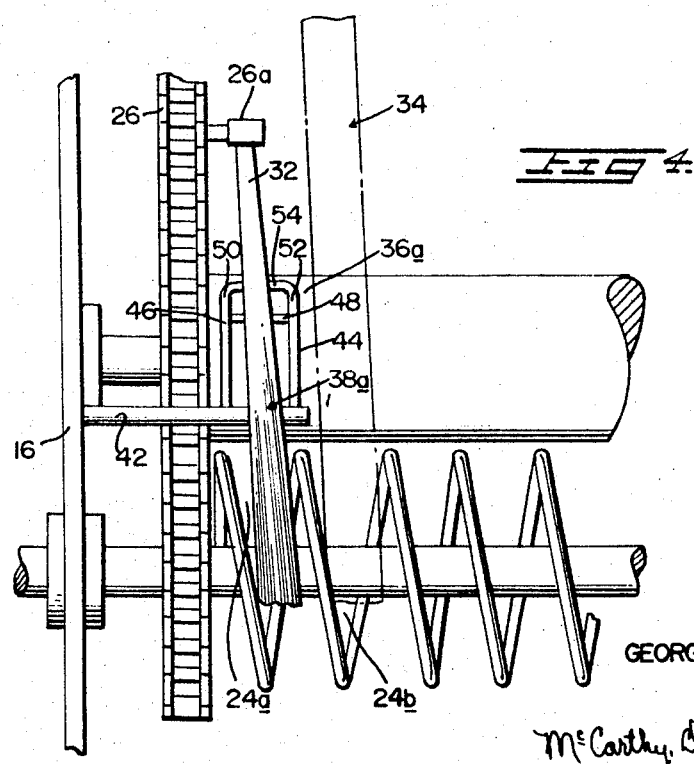
INVENTOR
GEORGE EDWARD ZIEGLER
ATTORNEYS

United States Patent Office 3,462,979
Patented Aug. 26, 1969

3,462,979
OVERFEED PREVENTION MEANS IN A SPIRAL DYE BECK OR THE LIKE
George Edward Ziegler, Balloch, Alexandria, Scotland, assignor to United Merchants and Manufacturers, Inc., New York, N.Y., a corporation of Delaware
Filed Apr. 19, 1968, Ser. No. 722,668
Int. Cl. B65h 75/02; B05c 3/152
U.S. Cl. 68—176                                6 Claims

ABSTRACT OF THE DISCLOSURE

A guide which is perpendicularly disposed in front of a horizontal idler reel above the first pocket in the spiral guide of a rope form fabric helix forming and liquid treating apparatus, of the type disclosed in Ziegler et al., Patent No. 3,308,639, granted Mar. 14, 1967, for the purpose of supporting the leading end of a new loop being formed and keeping it out of contact with the idler reel, which is traveling at a greater speed than the new loop, and feeding it to the main driving reel which then takes over movement of the new loop, at which time such new loop travels at the same speed as the previously formed loops, whereby the danger of overfeeding is obviated.

BACKGROUND OF THE INVENTION

Field of the invention

This invention generally appertains to new and novel improvements in apparatus for forming a rope form fabric helix in a tank, such as a dye beck, with such helix being composed of successive loops which, after being formed, are revolved in the tank so as to be continuously treated with a fluid. Such apparatus is disclosed in Ziegler et al., Patent No. 3,308,639, and the pending Ziegler et al. continuation-in-part application Ser. No. 713,119, filed Mar. 14, 1968.

More particularly, the present invention relates to new and novel improvements in the guiding of the rope fabric or strand during the formation of the loops.

Description of the prior art

The Ziegler et al. apparatus essentially comprises a main driver reel, in the form of a winch roller, which is rotatably mounted in the tank above the liquid bath chamber in the bottom of the tank, a spiral guide mounted in the tank on a rotatable axis parallel with and disposed below and in front of the axial center line of the main reel and a sprocket type conveyor chain to which the leading end of the rope fabric is attached, with the conveyor chain moving in an orbital path vertically about one end of the adjacent ends of the main reel and the spiral guide.

An idler reel is rotatably mounted in the tank and is positioned parallel with and above and slightly behind the spiral guide. The idler reel is a free wheeling roll that is driven only by the traction of the revolving loops passing from the liquid chamber of the tank up and through the pockets of the spiral guide and up and over the idler reel and then breaking close to a right angle in leading directly to the main reel, which frictionally grasps and moves the loops. The main reel is directly powered by a motor and constitutes the driver for all of the loops being formed.

The loops are formed by the movement of the conveyor chain in an orbital path around the adjacent ends of the main reel and the spiral guide, with the chain carrying the leading end of the rope fabric around such ends. The conveyor chain travels at a much slower speed than the loops already formed, which loops are being revolved by the main reel. The chain is much shorter than the loops but makes its cycle in the same amount of time, due to a timed drive relationship between the main reel and the chain.

The leading end of the rope fabric is attached to the chain and is passed up and over the idler reel. It then passes on over the main reel until the main driver reel makes contact with the leading end, with the surface speed of the main reel being much greater than that of the conveyor and the leading end forming the new loop. At this point, the main reel has sufficient frictional engagement of the new loop to pull such new loop and feed it down into the liquid chamber at the bottom of the tank, so that a portion thereof freely relaxes and pleats over. The conveyor chain continues on around bringing the end up into the pocket of the spiral guide, which advance the loop, and then the chain passes on to the beginning to start another new loop.

As the new loop is being formed, it is passing over the idler reel which is traveling at a greater speed than the new loop, which is being conveyed by the slower moving chain and the new loop makes contact with the idler reel prior to making contact with the main reel. Thus, the idler reel tends to overfeed the slower moving new loop of rope fabric down between the idler reel and the main reel, which tends to cause a tangling of the rope fabric.

SUMMARY OF THE INVENTION

The present invention relates to a guide means that is positioned so as to support the leading end of the new loop being formed and keep it off and out of contact with the idler reel and guide it directly to the main reel until the main reel takes over the movement of such new loop, at which time the new loop travels at the same speed as the loops which have previously been made. The new loop, when it enters the initial pocket in the spiral guide, is then pushed off from the guide means onto the idler reel due to the rotary movement of the spiral guide, thus leaving the guide means clear for receiving the leading end in the formation of a new loop.

The guide means is in the form of a guide of a width commensurate with the width of the rope fabric in its loop formation. The guide means is located above the initial or first pocket in the spiral guide and is positioned prependicularly in front of the portion of the idler reel located directly above the first pocket and has an upper portion that extends inwardly to overlie the frontal upper surface of the idler reel, with the upper portion directed toward the upper contacting surface of the main reel.

Accordingly, a primary object of the present invention is to provide means for preventing overfeeding of a new loop, as it is being formed on the spiral apparatus, and preventing consequent tangling of the rope fabric, so that all of the loops are formed and revolved in regular order and of the same predetermined size, in a smooth and efficient manner.

A further important object of the present invention is to provide a simple, sturdy and inexpensively fabricated and mounted guide for supportingly carrying the leading end of of a new loop past and out of contact with the idler reel and guidingly directing the leading end into contact with the main driver reel, with such guide offering no interference with the efficient operation of the apparatus but rather appreciably adding thereto.

BRIEF DESCRIPTION OF THE DRAWINGS

FIG. 3 is a detailed cross-sectional view, showing the guide means of the present invention in side elevation and on a larger scale.

FIG. 4 is a front elevational view of the guide means, showing the same in its environmental relationship with the spiral guide and idler reel, the latter elements being fragmentarily shown.

DESCRIPTION OF THE PREFERRED EMBODIMENT

Figure 1:
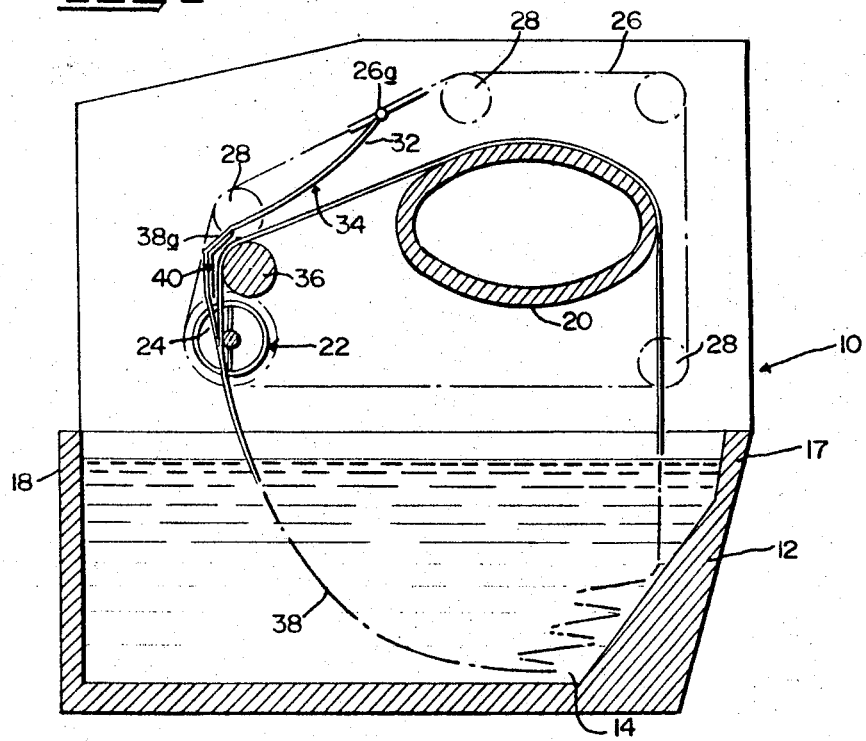
FIG. 1 is an interior end elevational view, partly schematic, of a tank or dye beck provided with an apparatus in accordance with the Ziegler et al. patent and applications, referred to above, and embodying this invention.
Figure 2:
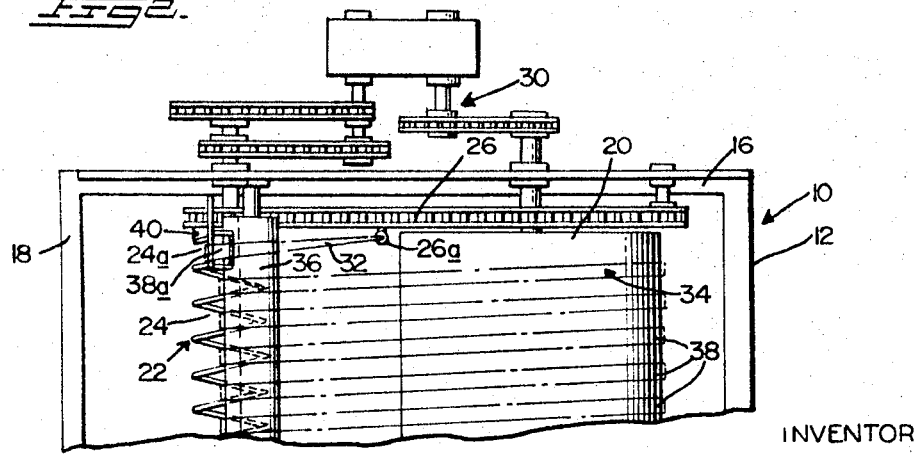
FIG. 2 is a top plan view of such end.

Referring now more particularly to the accompanying drawings, the apparatus 10 is similar to that disclosed in the Ziegler et al. Patent No. 3,308,639 and Ziegler pending applications, Ser. Nos. 630,154 now Patent No. 3,379,494 and 713,119.

The apparatus 19 essentially includes a tank 12 having a liquid bath chamber 14 in its bottom and having opposing end walls of which only the end wall 16 is shown.

A main reel 20, which is illustrated in the form of an elliptical winch roller, is rotatably journaled horizontally between the end walls and is disposed toward the back 17 of the tank above the liquid chamber 14. The main reel is driven by a prime mover (not shown) and is the driver for all of the loops being processed.

A spiral guide 22 is rotatably mounted between the tank end walls and is horizontally positioned in the upper portion of the tank adjacent at the front 18 thereof. The spiral guide is disposed below and in front of the main reel 20. The spiral guide, shown in the form of an open helical coil, has spaced apart coils or convolutions which define moveable pockets 24, of which the pocket 24a is the first or initial pocket and is disposed adjacent the end wall 16.

The spiral guide 22 functions, during the loading of the apparatus 10, as a guide means to guidingly advance the loops along the main reel in spaced side-by-side helical fashion and functions, during the liquid treating operation of the apparatus as a rotatable guide or peg rail to maintain the loops in proper form and order as they are revolved into and out of relaxed passage through the liquid chamber 14.

An endless conveyor chain 26 is entrained around guiding sprockets 28, of which one is a driving sprocket, with the sprockets being located in the arrangement shown in FIG. 1 at the tank wall 16. The driving sprocket is driven by a drive arrangement 30, which is connected to the main reel 20, and which, also, drives the spiral guide 22. Such drive arrangement ensures the rotation of the main reel 20 and the spiral guide 22 and the revolution of the chain 26 in a timed relationship and is similar to the drive arrangement disclosed in Ziegler Patent No. 3,308,639.

The conveyor chain 26 moves about the sprockets 28 in an orbital path vertically around the adjacent ends of the main reel 20 and the spiral guide 22. It is provided with a swivel finger 26a to which the leading end 32 of the rope fabric 34 is attached, so that the leading end is swivelly attached to the carrier chain.

An idler reel 36 is freely journalled in a horizontal position between the end walls of the tank and has its axis of rotation disposed above and slightly inwardly, with respect to the interior of the tank, of the axis of rotation of the spiral guide 22. The idler reel serves to support the formed loops 38 of the rope fabric 34, as the loops leave the pockets 24 of the spiral guide 22 and pass over and onto the upper surface of the rotating main reel 20. The idler reel, thus, prevents sagging of the loops 38 in their passage from the spiral guide to the main reel and maintains the passing flights of the loops between the spiral guide 22 and the main reel 20 in a friction-free and non-drag supported fashion, thus aiding in the maintenance of the loops at their proper size and spacement along the length of the main reel or from the front end wall 16 to the rear end wall of the tank 10.

The idler reel is a free wheeling roll that is driven only by the traction of the loops 38 passing up through the pockets 24 of the spiral guide 22 from the liquid chamber 14 and over the idler reel onto the main reel 20 which is the driver for all of the loops being processed.

A guide mans 40 is provided for supporting the leading end 32 of a new loop 38a being formed and keeping it off the idler reel until the main reel 20 takes over the movement of the new loop, at which time it travels at the same speed as the previously formed loops 36.

As shown more particularly in FIGS. 3 and 4, the guide means 40 includes a support arm 42 which projects laterally inwardly from the front end wall 16 of the tank, and is disposed horizontally above the initial or starting convolutions of the spiral guide 22. The support arm 42 is suitably fastened to the wall 16 or other suitable supporting structure and horizontally overlies the first pocket 24a of the spiral guide.

The arm supports a pair of upstanding rods 44 and 46, which extend upwardly and slightly outwardly from the arm, as shown in FIG. 3, and which are disposed in laterally spaced relation on the arm, as shown in FIG. 4. The rods are fixed at their lower ends to the arm and extend perpendicularly therefrom so as to vertically confront, in a spaced and slightly outwardly inclined relation, the front face of the end portion 36a of the idler reel 36 above the first pocket 24a of the spiral guide 22.

The rods 44 and 46 are laterally spaced apart a distance commensurate with the width of the rope fabric 34 and are connected at their upper ends by a cross rod 48. At this connection point, the rods extend inwardly and upwardly so that they have upper portions 50 and 52, which are upwardly and inwardly inclined to overlie in vertically spaced relation the frontal upper surface of the end portion 36a of the idler reel 36. The upper extensions or portions 50 and 52 are connected at their outer ends by a cross rod 54, which lies almost above the axial center line of the spiral guide 22 and directly overlies the pocket 24a thereof.

Thus, in essence, the guide means 40 is composed of a perpendicular portion that is disposed above the first pocket 24a of the spiral guide 22 and extends slightly over towards the second pocket 24b, as shown in FIG. 4 and which vertically confronts in a spaced fashion and at a slightly outward inclination the front surface of the end portion 36a of the idler reel 36. Also, the guide means is composed of an upper inwardly and upwardly inclined portion that overlies in vertically spaced relation the upper frontal surface of the idler reel end portion 36a.

As can be appreciated from a consideration of FIGS. 3 and 4, the guide means 40 receives and supports the leading end 32 of the loop 38a as it is being formed. The leading end of the newly forming loop 38a is supported by the guide means as it moves up and through the first pocket 24a of the spiral guide 22, so that the leading end is maintained out of contact with the rotating idler reel, which is revolving at the rate of speed of the previously formed loops 38, under the drive of the main reel 20. The leading end 32, carried by the chain 26, is brought on the guide means over to the main reel 20 and the main reel frictionally engages it and takes over the movement of the portion of the rope fabric that delineates the new loop 38a, at which time the new loop travels at the same speed as the previously formed loops 38.

The new loop 38a, as the leading end is carried around and under the spiral guide, is moved out of the pocket 24a and into the adjoining pocket 24b by the rotative movement of the spiral guide 22 so that the loop 38a is pushed then off the guide means 40 onto the idler reel, with the guide means being then empty and ready for the next new loop coming up.

It can thus be seen that a simple, sturdy and extremely reliable means is provided for preventing overfeeding of each new loop and consequent prevention of the accidental tangling of the fabric, with its attendant deleterious effects on the fabric, the process and the apparatus.

While a specific form of guide means has been disclosed, it can be appreciated that changes, both in form and arrangement, can be effected, as will occur to those skilled in the art. Therefore, the invention is not to be considered as limited to or by the abstract, disclosure and summary herein presented.

What is claimed is:

1. Apparatus for treating textile fabrics in rope form comprising a tank having a bottom liquid chamber, a main reel rotatably mounted in the tank horizontally above the chamber, a spiral guide rotatably mounted in the tank horizontally above the chamber and in spaced parallel relation with the main reel, said spiral guide having moveable pockets for guiding the fabric in formed loops, a carrier disposed at one end of the tank and movable in a vertical orbital path around the adjacent ends of the main reel and spiral guide and having means whereby the leading end of the rope fabric is swively attached thereto and carried thereby around the ends of the main reel and the spiral guide, drive means for rotating the main reel and the spiral guide and for revolving the carrier in timed relation so that the rope form fabric is sequentially formed in successive helical loops around the spiral guide and the main reel with a new loop being initially formed by the carrier in relation to the main reel and the spiral guide and with the laid-up loops being revolved by the main reel and being guided by the spiral guide, an idler reel disposed horizontally in the tank and positioned above and inwardly of the spiral guide and between the spiral guide and the main reel and over which the formed loops are supportingly passed in their movement from the spiral guide to the main reel, said idler reel being driven solely by the traction of the loops passing thereon and a guide positioned adjacent the carrier and disposed in spaced relation to an end portion of the idler reel above an initial pocket in the spiral guide at the carrier for receiving and supporting the leading end of a new loop being formed as it is brought up through the pocket by the carrier and directing such leading end to the main reel out of contact with the idler reel.

2. The apparatus of claim 1 wherein the guide overlies in spaced fashion the end portion of the idler reel.

3. The apparatus of claim 1 wherein said guide includes a perpendicular portion vertically overlying in spaced fashion the front surface of the idler reel above the first pocket and an upper inwardly and upwardly inclined portion overlying in spaced fashion the upper surface of the idler reel.

4. The apparatus of claim 3 wherein said portions are open and are composed of laterally spaced side-by-side rods that are connected at their lower and upper ends by cross rods.

5. The apparatus of claim 1 wherein said tank has an end wall adjacent the carrier and a lateral arm is supported thereby and on which the guide is supportingly attached in a perpendicular position.

6. The apparatus of claim 1 wherein said guide is disposed so as to maintain the loop out of contact with the front surface and upper surface of the idler reel over which surfaces the formed loops normally engagingly travel.

References Cited

UNITED STATES PATENTS

| 1,168,736 | 1/1916 | Palmer | 68—176 X |
| 2,684,586 | 7/1954 | Cramer et al. | 68—176 |
| 3,308,639 | 3/1967 | Ziegler et al. | 68—176 |

WILLIAM I. PRICE, Primary Examiner

U.S. Cl. X.R.

226—104; 242—55.01